United States Patent [19]

Bengtsson et al.

[11] Patent Number: 4,525,368

[45] Date of Patent: Jun. 25, 1985

[54] BLANCHING OF MUSHROOMS

[75] Inventors: Bengt L. Bengtsson, Bjuv; Peter Palmlin, Hëlsingborg, both of Sweden; Jan Ekholm, Valladolid, Spain

[73] Assignee: Nestec S.A., Vevey, Switzerland

[21] Appl. No.: 580,390

[22] Filed: Feb. 15, 1984

[30] Foreign Application Priority Data

Apr. 2, 1983 [EP]  European Pat. Off. ........ 83103282.6

[51] Int. Cl.$^3$ ................................................. A23B 7/06
[52] U.S. Cl. ..................................... 426/438; 426/615
[58] Field of Search ........................ 426/438, 524, 615

[56] References Cited

U.S. PATENT DOCUMENTS 3,597,239  8/1971  Vahlsing ............................. 426/438

FOREIGN PATENT DOCUMENTS 456346  11/1936  United Kingdom ................ 426/438

OTHER PUBLICATIONS

Greenspun et al, "Chips And Other Food Items From Deep-Fat Fried Mushrooms", *U.S. Dept. of Agriculture*, ARS 73-44, Oct. 1964.

*Primary Examiner*—George Yeung
*Attorney, Agent, or Firm*—Vogt & O'Donnell

[57] ABSTRACT

A process for blanching mushrooms in which mushrooms are treated with an edible frying oil at a temperature from 120° C. to 220° C. for a period of from 2.5 to 30 seconds and then separated from the liquid medium before being deep-frozen.

4 Claims, No Drawings

BLANCHING OF MUSHROOMS

The present invention relates to a process for blanching mushrooms, more particularly for blanching mushrooms in frying oil.

Frozen mushrooms that have been blanched by conventional means in steam or hot water have good storage stability but their texture is degraded and they lose about 40% of their weight during the blanching. Frozen mushrooms that have not been blanched have poor storage stability and rapidly turn brown when thawed under improper conditions. The main objective of blanching mushrooms is to inactivate the hazardous enzymes, mainly polyphenol oxidase, so that a product with superior storage properties is obtained i.e. a product with no discolouration and no off-flavour development.

We have tried a relatively short blanching treatment at 100° C. in water, for a time from 5 to 20 seconds depending on the type, size and shape of the mushroom, to prolong the storage time by inactivating the enzymes at the surface but the texture of the mushroom was degraded. We have also tried blanching in super-heated steam at temperatures above 100° C. but the weight losses were similar to those obtained with conventional blanching procedures.

An object of this invention is to provide a blanching method which substantially preserves the unique quality factors such as flavour, colour and especially texture of fresh mushrooms in the frozen counterpart and to restrict the loss in weight.

According to the present invention, there is provided a process for blanching mushrooms characterised in that the mushrooms are treated with an edible frying oil at a temperature from 120° C. to 220° C. for a period from 2.5 to 30 seconds and then separated from the liquid medium before being deep-frozen.

The edible frying oil may be a natural or hydrogenated oil and examples of oils that may be used are animal or vegetable oils for instance, corn, soy, cotton seed, palm, olive, peanut, coconut, sesame, raisin seed, safflower seed, fish oil, lard, or butter oil. Hydrogenated oils are preferably used because of their greater stability.

The frying oil should desirably fulfil all normal requirements of a high quality oil and it should be heat stable, have a high resistance to the development of rancidity and should transfer substantially no off-flavour to the product. The frying oil has a melting point preferably from 40° C. to 65° C.

The mushrooms are preferably fresh and recently harvested and are conveniently sliced before blanching. The process is applicable not only to common mushrooms such as *Agaricus bisporus* but also to other varieties such as Cantharellus and Boletus species.

The temperature of the blanching treatment is preferably from 130° C. to 200° C. and especially from 140° C. to 190° C. The duration of the blanching treatment may conveniently be from 5 to 25 seconds preferably from 7.5 to 20 seconds and especially from 9 to 17.5 seconds.

Afterwards the blanched mushrooms are separated from the liquid medium and deep-frozen.

The loss in weight of the mushrooms blanched by the process of this invention is significantly less than that sustained by conventionally steam- or water-blanched mushrooms.

The frozen product has a texture that is superior to that of conventionally steam- or water-blanched mushrooms and the sensitivity to temperature fluctuations (freeze-thaw) as well as the storage life are considerably improved when compared to that of unblanched mushrooms. The appealing white mushroom colour is maintained throughout the whole processing and distribution chain up to the consumer.

The frozen mushrooms are especially suitable for use in prepared products like omelettes or as toppings such as pizza toppings.

The following examples further illustrate the present invention:

EXAMPLE 1

Freshly harvested mushrooms (*Agaricus bisporus*) were washed and sliced into 6 mm slices and then oil-blanched in a conventional deep-fryer AKO-Frite (a hydrogenated palm oil having a melting point of 35° C. containing from 5–10% linoleic acid, 40–50% saturated fatty acids and the remainder comprising oleic acid and added antioxidants) sold by Karlshamns Oljefabriker, Sweden at 160° C. for 10 seconds and then separated. The polyphenol oxidase activity was reduced by 94% and the yield was 81.7%. The oil-blanched mushrooms were fried and then incorporated as a filling in pancakes which were then deep-frozen. After storage the pancakes were reheated and the oil-blanched mushrooms showed a firmer and more appetising texture than that of standard blanched mushrooms used as a pancake filling. There was no significant difference in flavour from pancakes containing standard steam-blanched mushrooms as a filling.

EXAMPLE 2

A similar procedure to that described in Example 1 was followed except that the blanching was carried out at 180° C. for 15 seconds. The polyphenol oxidase activity was reduced by 97% and yield was 73%. The texture was firmer than that of conventionally blanched mushrooms and the storage properties were similar to those of conventionally blanched mushrooms.

We claim:

1. A process for blanching mushrooms while substantially preserving their weight and texture comprising treating the mushrooms with an edible frying oil at a temperature from 120° C. to 220° C. for a period of from 2.5 to 30 seconds to blanch the mushrooms, then separating the mushrooms from the frying oil and then deep freezing the oil-blanched mushrooms.

2. A process according to claim 1 wherein the frying oil has a melting point from 40° C. to 65° C.

3. A process according to claim 1 wherein the temperature of the blanching treatment is from 140° C. to 190° C.

4. A process according to claim 1 wherein the duration of the blanching treatment is from 7.5 to 20 seconds.

* * * * *

UNITED STATES PATENT AND TRADEMARK OFFICE
CERTIFICATE OF CORRECTION

PATENT NO. : 4,525,368

DATED : June 25, 1985

INVENTOR(S) : Bengt L. Bengtsson, et al.

It is certified that error appears in the above—identified patent and that said Letters Patent is hereby corrected as shown below:

On the title page of Letters Patent, line 2 of the heading "Inventors:", "Hëlsingborg" should read --Hälsingborg--.

Signed and Sealed this

Seventeenth Day of September 1985

[SEAL]

Attest:

Attesting Officer

DONALD J. QUIGG

Commissioner of Patents and Trademarks—Designate